United States Patent [19]

Hansson

[11] Patent Number: 5,519,604
[45] Date of Patent: May 21, 1996

[54] METHOD AND DEVICE FOR TIGHTENING THREADED JOINTS

[75] Inventor: Gunnar C. Hansson, Stockholm, Sweden

[73] Assignee: Atlas Copco Tools AB, Nacka, Sweden

[21] Appl. No.: 299,917

[22] Filed: Sep. 1, 1994

[30] Foreign Application Priority Data

Sep. 2, 1993 [SE] Sweden .................. 9302837

[51] Int. Cl.$^6$ .................................. G05B 9/02
[52] U.S. Cl. .................. 364/148; 364/474.15
[58] Field of Search .............. 364/148, 167.01, 364/474.15, 474.16; 29/407, 446, 428, 240; 81/469, 467; 73/862.08, 862.21, 862.23, 862.26; 318/432, 434, 689

[56] References Cited

U.S. PATENT DOCUMENTS

| | | | |
|---|---|---|---|
| 4,510,424 | 4/1985 | Doniwa | 318/432 |
| 4,908,926 | 3/1990 | Takeshima et al. | 29/407 |
| 4,987,806 | 1/1991 | Lehnert | 81/469 |
| 4,995,145 | 2/1991 | Eshghy | 29/407 |
| 5,062,491 | 11/1991 | Takeshima et al. | 173/12 |
| 5,094,301 | 3/1992 | Wipperman et al. | 173/1 |
| 5,152,046 | 10/1992 | Abe | 29/407 |
| 5,205,031 | 4/1993 | Hansson . | |
| 5,215,270 | 6/1993 | Udocon et al. . | |
| 5,216,795 | 6/1993 | Hansson . | |
| 5,229,931 | 7/1993 | Takeshima et al. | 364/133 |
| 5,245,747 | 9/1993 | Hansson . | |
| 5,285,857 | 2/1994 | Shimada | 173/1 |

FOREIGN PATENT DOCUMENTS

| | | |
|---|---|---|
| 0285815A1 | 10/1988 | European Pat. Off. . |
| 0419436A3 | 3/1991 | European Pat. Off. . |
| 0419435A3 | 3/1991 | European Pat. Off. . |

OTHER PUBLICATIONS

Patent Abstracts of Japan, vol. 16, No. 534 (M–1334) Nov. 4, 1992 & JP–A–04 201 022 (Sanyo Mach Works Ltd) Jul. 22, 1992, Screw Fastening by Multi–Nut Runner.

*Primary Examiner*—James P. Trammell
*Attorney, Agent, or Firm*—Frishauf, Holtz, Goodman, Langer & Chick

[57] ABSTRACT

A method and a device for tightening threaded joints to a desired pretension level using a manually operated power nutrunner and controlling the tightening process by determining, during a tensioning phase, the instantaneous growth per time unit of the torque resistance from the joint, and adapting continuously the rotation speed of the nutrunner in relation to the determined instantaneous torque growth per time unit so as to obtain the same reaction force characteristics in the nutrunner handle for all joints, regardless of differences in torque resistance growth per angle of rotation between the joints.

22 Claims, 4 Drawing Sheets

METHOD AND DEVICE FOR TIGHTENING THREADED JOINTS

BACKGROUND OF THE INVENTION

The invention concerns a method and a device for tightening threaded joints, considering in particular the ergonomic aspects or reaction force characteristics when using manually operated power nutrunners.

Working with a power nutrunner, for instance of the angled type, tend to be rather tiresome for the operator due mainly to the fact that he or she is exposed to the reaction force imparted in the tool housing and handle during each tightening cycle.

In previous studies it has been established that the discomfort to the operator, i.e. the effort needed to counteract the reaction force, depends on the operator's actual working posture, as well as on the character of the reaction force to be handled. Important factors are: magnitude, duration and speed of force build-up and force decrease.

In these studies it has also been shown that the nutrunner together with the arms of the operator respond to the reaction force impulse like a damped mass-spring system with a certain resonance frequency. Accordingly, the duration of the reaction force impulse in relation to the resonance frequency is determining for the resultant amplitude in the nutrunner handle and the discomfort to the operator.

The resonance frequency or system period of the nutrunner-operator arm system depends both on the operator's physical properties and his actual working posture. In other words, the system period is dependent on the ability of the operator to withstand the reaction force impulse.

For a particular person and a certain working posture, the resulting amplitude, which is a measure of the operator's discomfort, depends on the duration of the reaction force impulse. To show by means of an experiment, a half-sine excitation force of different duration has been exerted on a typical nutrunner-operator reaction absorbing system.

The method and the device according to the invention make it possible to:

1. adapt the reaction force impulse to what suits an average operator best for a particular tightening operation, taking into consideration torque applied, joint rate (stiffness), working posture (upright, bending over, upside down etc.)

2. adaptively maintain the reaction force impulse characteristics as the joint stiffness fluctuates.

3. allow easy readjustment to modify the reaction force impulse characteristics to suit different operators (strong/weak) performing the same operations on an assembly line.

As illustrated in FIGS. 1a, 1b, 1c and 2, a short reaction force impulse having a duration equal to ¼ of the system period (Force F1 FIG. 1a) causes a small amplitude movement only of the operator's arm. See FIG. 2. This is due to the fact that the reaction energy is mainly absorbed by the inertia of the nutrunner itself and to some extent by the inertia of the operator's arm. Such a short lasting reaction force impulse is generated at tightening of a stiff joint, i.e. a joint having a steep torque/rotation characteristic.

FIGS. 1a, 1b, 1c and 2 also illustrate that a long lasting reaction force impulse having a duration equal to a full system period (Force F3 FIG. 1c) causes just a moderate reaction amplitude. At this long lasting impulse, which has slower build-up and ceasing phases, the inertia of the system has no influence upon the reaction impulse absorption. Instead, the operator is able to react in time to be ready to apply muscular force on the nutrunner to counteract the reaction force. This is the case when tightening a so called soft joint, i.e. a joint having a low torque growth/rotation characteristic.

When, however, the joint to be tightened has a medium-soft characteristic (Force F2 FIG. 1b) the inertia of the system has a small influence only on the impulse obsorption, and neither is the operator able to fast enough apply muscle force on the nutrunner handle. Instead, the operator's reaction is late and out of phase with the reaction force impulse, which causes an amplified distortion of the operator's arm and, if repeated, a tiresome discomfort to the operator. See FIG. 2.

Operators tend to describe their tools behavior as "no kick", "kicks", "smooth" or "long pull", which will be explained more in detail. It means roughly that in the "no kick" case, no reaction impulse is felt because the torque impulse is very short. In the "kick" case, the reaction impulse has a typical duration of 0.1–0.3 sec. and is too quick and abrupt for the operator to react to and counteract. Therefore, the "kick" impulse strains the operator physically. "Smooth" means an impulse time of 1.5–2 sec., while longer impulse durations, characterized as "long pull" by the operators, more equals the effort of using a manual wrench.

Impulse duration times which give the most comfortable operation have been found to range between 0.3 and 1.0 sec. dependent on factors like torque level, operator's reaction time, actual working posture, etc.

The examples of reaction impulse times given above are relevant for the most common screw joint sizes: M8 to M10. The described principles apply for both smaller and larger joints, but preferred impulse times vary.

Another discomforting factor for the operator is the occurring variations in the reaction pulse charcteristics of the joints being tightened. It is difficult and tiresome to try to keep up a readiness for reaction impulses of different character.

SUMMARY OF THE INVENTION

The main object of the present invention is to accomplish an improved method for tightening threaded joints by a manually operated power nutrunner, which method comprises measures by which the discomforting reaction force impulse is given a character which is equal at all joints, regardless of differences in torque rate, i.e. torque resistance growth per angle of rotation.

Preferred embodiments of the invention are described below with reference to the accompanying drawings.

DETAILED DESCRIPTION

Figure 1A:
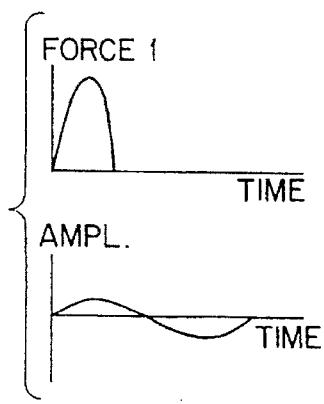
FIGS. 1a, 1b, 1c and 2 illustrate by means of diagrams the reaction force influence upon the operator at different reaction force durations.
Figure 1B:
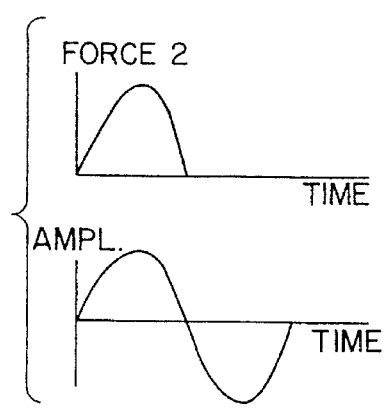
Figure 1C:
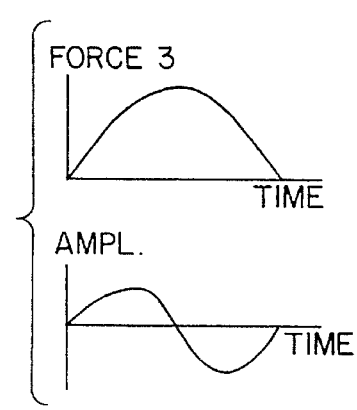
Figure 2:
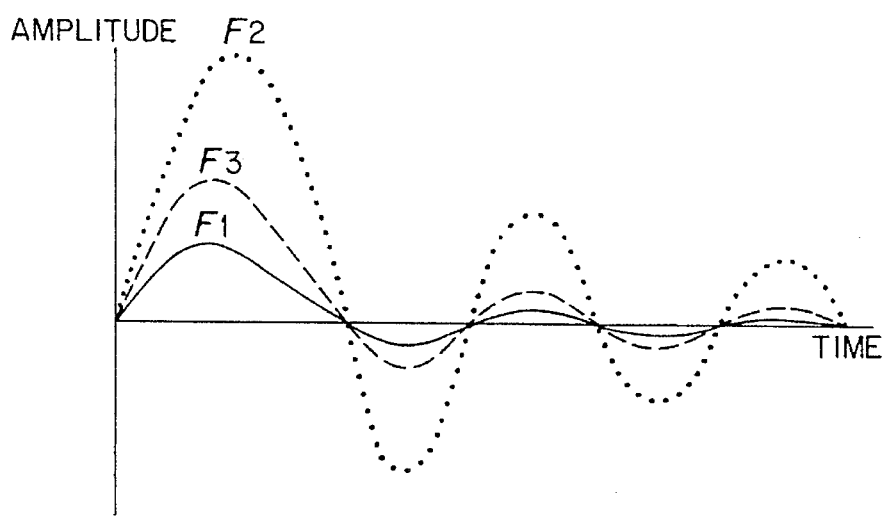
Figure 3:
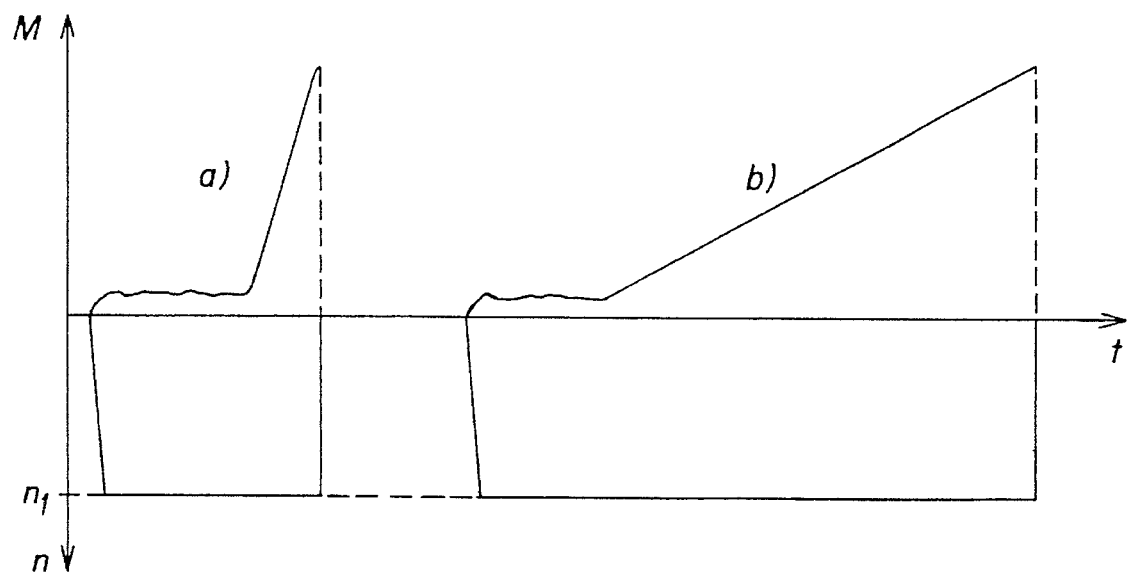
FIG. 3 show prior art tightening of a) a stiff joint and b) a soft joint.

As illustrated in FIG. 3, prior art tightening of threaded joints by means of power nutrunners with power controlled electric drive motors has been carried out with constant speed $n_1$. This means that for a stiff joint a), the torque resistance in the joint as well as the reaction torque in the nutrunner is built up very rapidly from an initial very low running down torque to the final torque at the desired pretension level. The resultant reaction force impulse in the nutrunner handle has a very short duration.

In contrast thereto, a soft joint b) tightened by the same method causes a slowly increasing torque reaction and, accordingly a long lasting reaction force impulse.

As illustrated in FIGS. 1a, 1b, 1c and 2, the resultant amplitude of the nut runner handle and the operator's discomfort varies in accordance with the duration of the reaction force impulse. Either of the reaction force impulses from both joints a) and b) are really discomforting to the operator, or at least one of them is.

To avoid variations in the reaction force impulse length, which are discomforting per se, and to accomplish a uniform reaction force impulse length having the most favourable characteristic from the ergonomic point of view, the invention comprises the measure of determining during the tensioning phase of the tightening process the instantaneous torque resistance growth per time unit.

Simultaneously, this actual torque resistance growth per time unit is compared during the entire tensioning phase with desired values stored in a programmable control unit, and the rotation speed of the nutrunner is continuously adapted to the actual torque growth per time unit value so as to obtain a desired character on the reaction force impulse in the nutrunner handle.

By this method, the character of the reaction force impulse will be the same for all joints, regardless of the difference in torque growth per rotation angle, i.e. torque rate, from one joint to another.

Figure 4:
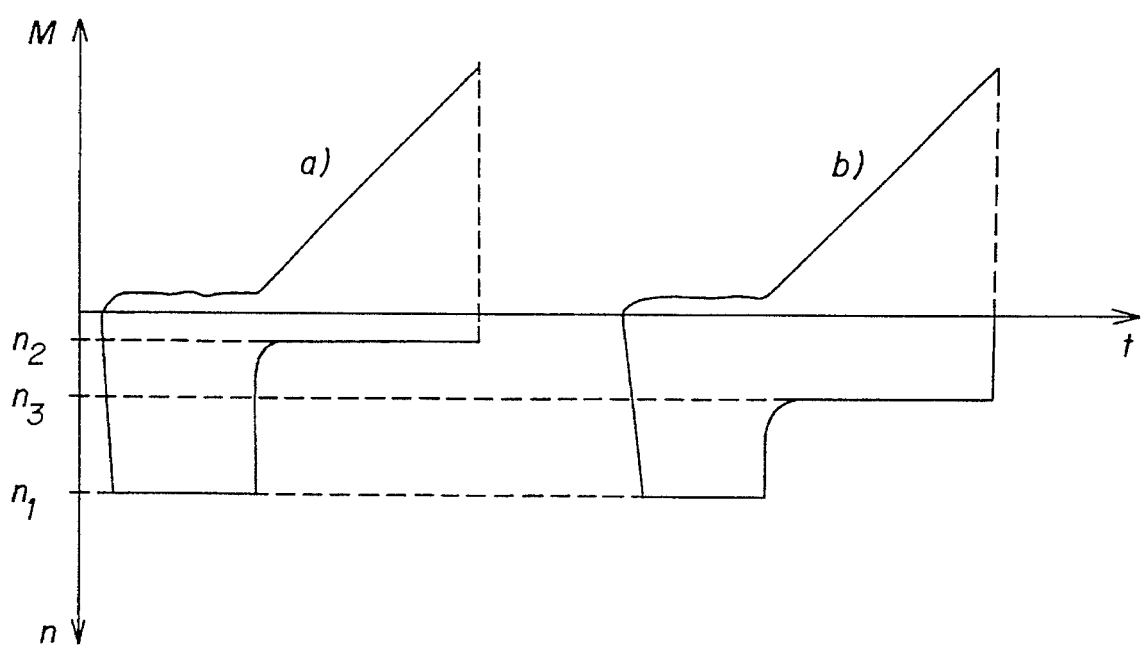
FIG. 4 shows tightening processes according to the invention of a) a stiff joint and b) a soft joint.

In FIG. 4, the method according to the invention is illustrated in applications on the same two joints a) and b) as referred to in FIG. 3. The initial running down phase is carried through by having the nutrunner rotate the joints at substantially the same speed $n_1$ as in the illustrated prior art method illustrated in FIG. 3.

As the pretensioning phase starts, the rotation speed of the nutrunner is lowered to the speed level $n_2$ in the joint a) case and to the speed level $n_3$ in the joint b) case. In the illustrated example, $n_3$ is about three times $n_2$, which results in the same torque growth per time unit, i.e. the same inclination of the torque/time curve during the pretensioning phase for both joints. At joints with the same desired pretension level, the duration of the reaction force impulse in the nutrunner handle will also be the same from joint to joint.

To further improve the character or pattern of the reaction force impulse, the control means are programmed to determine the instantaneous second derivative of the torque growth per time unit and to govern the rotation speed of the nutrunner so as to obtain a continuous second derivative of the torque growth per time unit function, both at the start of the pretensioning phase and at the end of same.

Still another measure to improve the reaction force impulse character is to provide a small operator alerting reaction force increase before the real or main reaction force impulse, starts. By this alerting force impulse the operator is made ready to apply muscle force on the nutrunner handle to counteract the reaction force.

The reaction force impulse is even more adapted to the operator's ability to react on changing loads in that the output torque of the nutrunner is gradually decreased to zero after the desired pretension level is reached and the nutrunner has ceased rotating.

Figure 5:
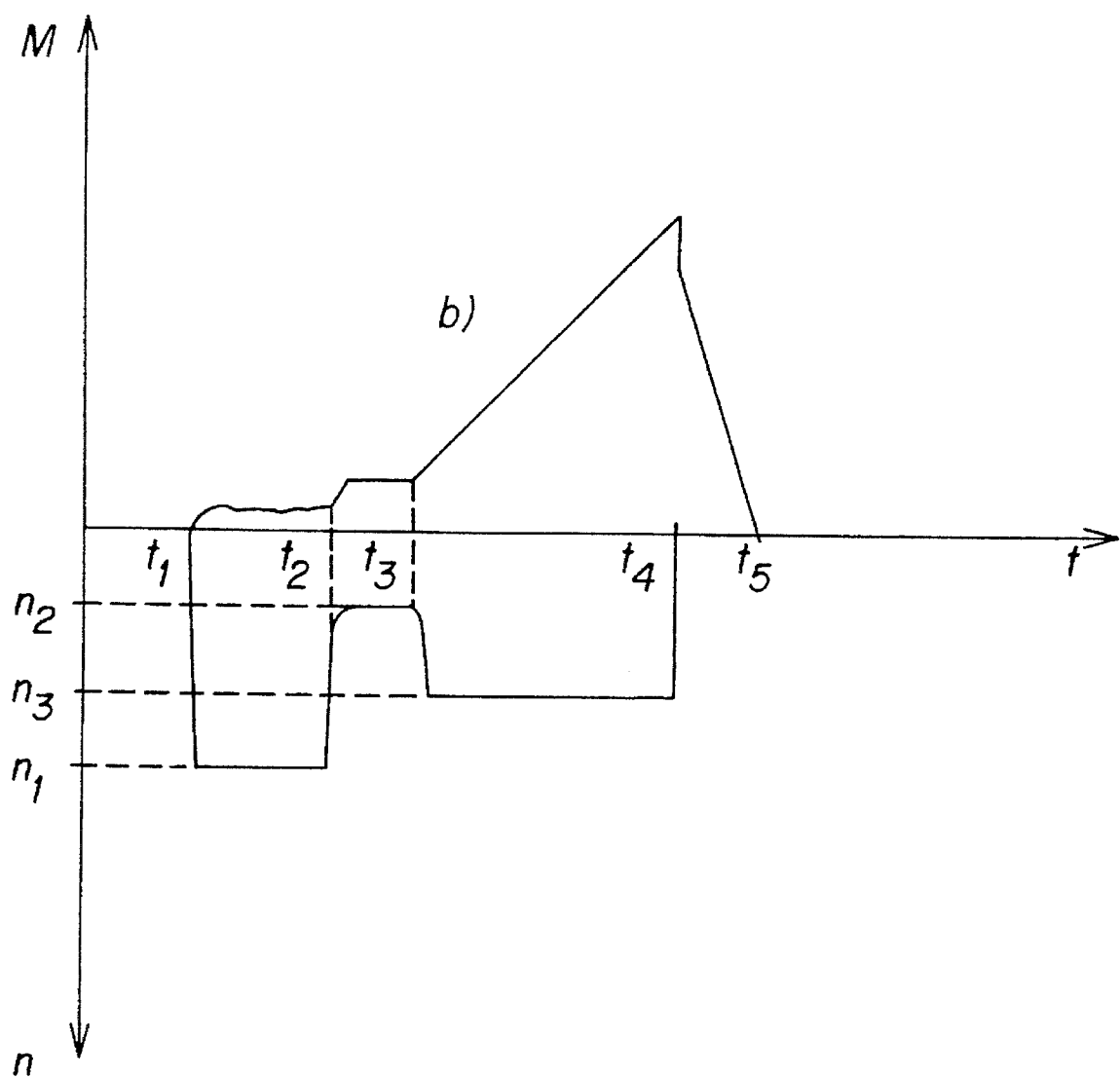
FIG. 5 shows a further sophisticated embodiment of the tightening method according to the invention.

Both of these additional features of the screw joint pretensioning method according to the invention are illustrated in FIG. 5. The joint being tightened is assumed to have a low torque rate like joint b) shown in FIG. 3.

The process illustrated in FIG. 5 starts its running down phase at $t_1$ and at a rotation speed $n_1$. At $t_2$, the rotation speed is decreased substantially to $n_2$, which is a high enough speed to generate an operator alerting reaction force impulse as the torque resistance in the joint starts growing. At $t_3$, the main pretensioning phase starts at a rotation speed $n_3$ which is adapted as described above so as to obtain a desired reaction force growth per time unit. As the desired pretension level is reached at $t_4$, the nutrunner torque output is lowered, whereby the joint stops rotating. Thereafter, the torque output from the nutrunner is gradually lowered to zero which is reached at $t_5$. Thereby, the operator is not exposed to an instantaneous reaction force disappearance which would have caused him further discomfort.

Figure 6:
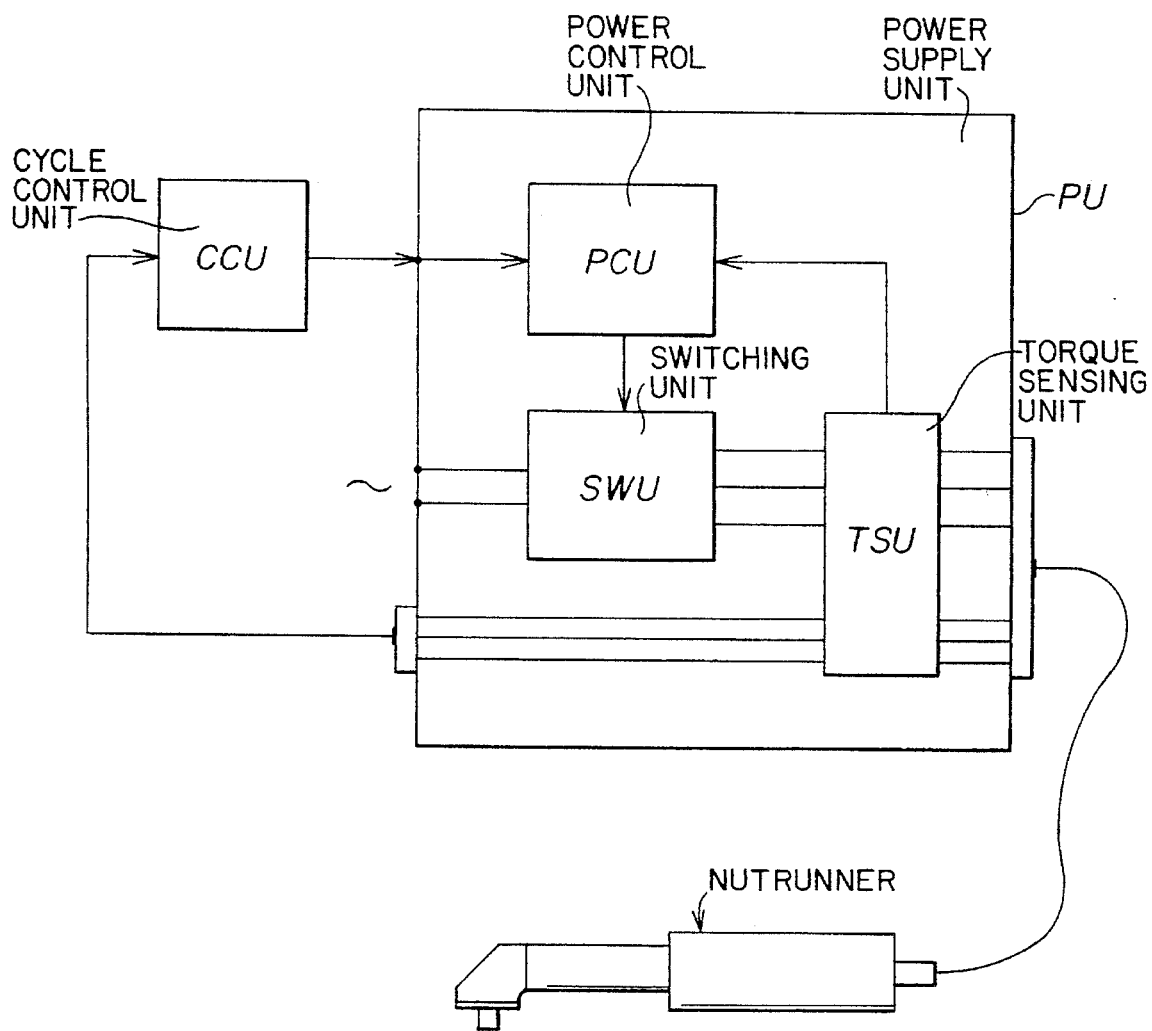
FIG. 6 shows a device for carrying out the tightening method according to the invention.

The device shown in FIG. 6 comprises an angle nutrunner having a brushless AC-motor and which is connected to a power supply unit PU. The latter is arranged to deliver AC power of variable amplitude and frequency in accordance with data stored in a programmable power control unit PCU. The latter is connected to a torque sensing unit TSU producing signals in response to the actual power output from a switching unit SWU. A cycle control unit CCU is connected to the power supply unit PU.

I claim:

1. A method for tightening a threaded joint to a desired pretension level by means of a manually operated power nutrunner having a handle portion which is hand held by an operator, the method comprising rotating the joint being tightened through a running down phase and a tensioning phase, sensing during rotation of the joint the momentary torque resistance in the joint, and terminating the rotation of the joint at the attainment of said desired pretension level, further comprising the steps of:

determining during said tensioning phase, an instantaneous torque resistance growth per time unit in the joint being tightened; and adapting continuously the rotation speed of the nutrunner in relation to said determined instantaneous torque growth per time unit so as to obtain a desired reaction force impulse characteristic in the nutrunner handle, independent of the specific joint being tightened.

2. Method according to claim 1, wherein the rotation speed is adapted such that a reaction force in the nutrunner handle is selectable by quantitative parameters, including a rate of change in said reaction force over time.

3. Method according to claim 1, wherein the rotation speed is adapted such that a reaction force in the nutrunner handle is selectable by qualitative parameters, including a pattern of a variation in said reaction force over time.

4. Method according to claim 3, wherein the reaction force is selectable to be built up according to a linear function of time.

5. Method according to claim 4, wherein a start of said linear function of time has a second derivative of a substantially continuous character.

6. Method according to claim 5, wherein an end of said linear function of time has a second derivative of a substantially continuous character.

7. Method according to claim 4, wherein an end of said linear function of time has a second derivative of a substantially continuous character.

8. Method according to claim 7, wherein said reaction force build-up is preceded by an operator alerting low magnitude reaction force.

9. Method according to claim 6, wherein said reaction force build-up is preceded by an operator alerting low magnitude reaction force.

10. Method according to claim 5, wherein said reaction force build-up is preceded by an operator alerting low magnitude reaction force.

11. Method according to claim 4, wherein said reaction force build-up is preceded by an operator alerting low magnitude reaction force.

12. In a hand held power nutrunner for tightening a threaded joint by rotating the joint being tightened through a running down phase and a tensioning phase, sensing during rotation of the joint the momentary torque resistance in the joint, and terminating the rotation of the joint at the attainment of said desired pretension level, the power nutrunner comprising:
 a housing having a handle portion which is hand held by an operator;
 a motor;
 a rotatable output shaft drivingly coupled to the motor and connectable to a threaded joint to be tightened;
 a power supply unit (SWU) connected to the motor; and
 a programmable control unit (PCU) connected to said power supply unit (SWU), and including a torque sensor and a rotation sensor (TSU); and said programmable control unit (PCU) comprising:
 means for determining the instantaneous torque growth in the joint being tightened per time unit; and
 means for adapting continuously the rotation speed of the nutrunner output shaft in relation to the instantaneous torque growth per time unit and to a desired torque growth per time unit stored in said programmable control unit (PCU).

13. The power nutrunner of claim 12, wherein said adapting means adapts the rotation speed such that a reaction force in the nutrunner handle is selectable by quantitative parameters, including a rate of change in said reaction force over time.

14. The power nutrunner of claim 12, wherein said adapting means adapts the rotation speed such that a reaction force in the nutrunner handle is selectable by qualitative parameters, including a pattern of a variation in said reaction force over time.

15. The power nutrunner of claim 14, wherein the reaction force is selectable by said adapting means to be built up according to a linear function of time.

16. The power nutrunner of claim 15, wherein a start of said linear function of time has a second derivative of a substantially continuous character.

17. The power nutrunner of claim 16, wherein an end of said linear function of time has a second derivative of a substantially continuous character.

18. The power nutrunner of claim 15, wherein an end of said linear function of time has a second derivative of a substantially continuous character.

19. The power nutrunner of claim 18, wherein said reaction force build-up is preceded by an operator alerting low magnitude reaction force.

20. The power nutrunner of claim 17, wherein said reaction force build-up is preceded by an operator alerting low magnitude reaction force.

21. The power nutrunner of claim 16, wherein said reaction force build-up is preceded by an operator alerting low magnitude reaction force.

22. The power nutrunner of claim 15, wherein said reaction force build-up is preceded by an operator alerting low magnitude reaction force.

* * * * *